(12) United States Patent
Brott

(10) Patent No.: US 10,040,993 B1
(45) Date of Patent: Aug. 7, 2018

(54) CHEMILUMINESCENT MATERIALS AND METHOD OF MAKING SAME

(71) Applicant: The United States of America, as represented by the Secretary of the Air Force, Washington, DC (US)

(72) Inventor: Lawrence L. Brott, West Chester, OH (US)

(73) Assignee: The United States of America, as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/586,704

(22) Filed: May 4, 2017

Related U.S. Application Data

(60) Provisional application No. 62/338,678, filed on May 19, 2016.

(51) Int. Cl.
| | | |
|---|---|---|
| *C09K 11/07* | (2006.01) |
| *B01J 13/14* | (2006.01) |
| *F21K 2/06* | (2006.01) |
| *B01J 13/04* | (2006.01) |
| *B01J 13/18* | (2006.01) |
| *C09B 3/36* | (2006.01) |

(52) U.S. Cl.
CPC .............. *C09K 11/07* (2013.01); *B01J 13/04* (2013.01); *B01J 13/185* (2013.01); *C09B 3/36* (2013.01); *F21K 2/06* (2013.01)

(58) Field of Classification Search
CPC ...................................................... C09K 11/07
USPC ........................................................ 252/700
See application file for complete search history.

(56) References Cited

U.S. PATENT DOCUMENTS 8,137,597 B1 * 3/2012 Brott ........................ F21K 2/06
                                                         252/700

* cited by examiner

*Primary Examiner* — Vu A Nguyen
(74) *Attorney, Agent, or Firm* — AFMCLO/JAZ; Timothy Barlow

(57) ABSTRACT

Chemiluminescent materials are provided that include an encapsulated oxalate-containing composition that includes a core portion and a polymeric coating, a peroxide source, and a fluorescent dye. The core portion includes an oxalate; a polymerizable component composition that polymerizes upon exposure to ultraviolet radiation; a photosensitizer; and an ultraviolet screening agent. The polymeric coating layer surrounding the core portion comprises a polymer derived from the polymerizable component composition. A fluorescent dye may be intermixed in the oxalate-containing composition, intermixed with the peroxide source, present in the chemiluminescent material as a separate dye layer or particle, or present within another component of the chemiluminescent material. A method for making the chemiluminescent material is also provided.

19 Claims, 3 Drawing Sheets

CHEMILUMINESCENT MATERIALS AND METHOD OF MAKING SAME

PRIORITY

Pursuant to 37 C.F.R. § 1.78(a)(4), this application claims the benefit of and priority to prior filed Provisional Application Ser. No. 62/338,678, filed 19 May 2016, which is expressly incorporated herein by reference.

RIGHTS OF THE GOVERNMENT

The invention described herein may be manufactured and used by or for the Government of the United States for all governmental purposes without payment of any royalty.

FIELD OF THE INVENTION

The invention is directed to chemiluminescent materials and, more particularly, to encapsulated chemiluminescent materials and methods of making same.

BACKGROUND OF THE INVENTION

Chemiluminescence is achieved by a reaction of two or more chemicals to create light. One class of chemiluminescence is based on a peroxide-oxalate reaction using a mixture of hydrogen peroxide with an oxalate and a dye dissolved in a suitable solvent. Hydrogen peroxide reacts with the oxalate to produce an unstable strained ring peroxyacid ester intermediate (i.e., 1,2-dioxetanedione), which in turn decomposes spontaneously to carbon dioxide releasing energy that excites the dye. As the excited dye returns to its ground state, a photon of light is released.

Most commercially-available "glow sticks" utilize this peroxide-oxalate reaction and can produce light for over 6 hours in a wide variety of colors. The structure of the dye determines the wavelength of light emitted. Exemplary dyes used in glow sticks include 9,10-diphenylanthracene to create blue light, or rhodamine B to create red light. Advancements in glow stick chemistry have generally focused on extending the lifetime of the chemical reaction, increasing its brightness, or creating new colors.

In U.S. Pat. No. 8,137,597, which is incorporated herein by reference in its entirety, a one-part, pressure activated chemiluminescent material suitable for micro-scale application is disclosed, where a free-flowing powder is made by coating microcapsules, which are filled with a solvent and dye, with a powdered oxalate and a solid source for hydrogen peroxide. The formation of the microcapsules comprising the solvent and dye is a chemical encapsulation involving a complex coacervation technique, in-situ microencapsulation technique, or an interfacial microencapsulation technique. The chemiluminescence reaction begins when the capsules are crushed. The fractured microcapsule releases the solvent, which dissolves both the oxalate and the hydrogen peroxide source, and the concomitant solution phase reaction between the dissolved solids (i.e., oxalate and peroxide) releases energy that excites the dye to produce the chemiluminescent light.

Investigations into the known methods of making and packaging the reactants have revealed that the micro-capsules obtained by the complex coacervation technique may entrain a small quantity of water droplets within the core of the capsule. The entrained water can slowly degrade one or more of the reactants and thereby shorten the shelf-life of this chemiluminescent material.

Accordingly, new chemiluminescent materials and manufacturing methods are needed.

SUMMARY OF THE INVENTION

In accordance with an embodiment of the present invention, a chemiluminescent material is provided that comprises an encapsulated oxalate-containing composition, a peroxide source, and a fluorescent dye. The encapsulated oxalate-containing composition includes a core portion and a polymeric coating. The core portion comprises the oxalate-containing composition that includes an oxalate; a polymerizable component composition comprising one or more monomers and/or oligomers that polymerize upon exposure to ultraviolet radiation, wherein the one or more monomers and/or oligomers are selected from the group consisting of acrylate monomers, acrylate oligomers, methacrylate monomers, methacrylate oligomers, and combinations thereof; a photosensitizer; and an ultraviolet screening agent. The polymeric coating layer surrounding the core portion comprises a polymer derived from the polymerizable component composition. A fluorescent dye may be intermixed in the oxalate-containing composition, intermixed with the peroxide source, present in the chemiluminescent material as a separate dye layer or particle, or present in the chemiluminescent material within one or more of the other components of the chemiluminescent materials (e.g., oxalate or UV screening dye).

In accordance with another embodiment of the invention, a chemiluminescent material comprises an encapsulated oxalate-containing composition, comprising: a core portion comprising the oxalate-containing composition comprising: an oxalate; a polymerizable component composition comprising one or more monomers and/or oligomers that polymerize upon exposure to ultraviolet radiation, wherein the one or more monomers and/or oligomers is selected from the group consisting of acrylate monomers, acrylate oligomers, methacrylate monomers, methacrylate oligomers, and combinations thereof; a photosensitizer; and an ultraviolet screening agent; a polymeric coating layer surrounding the core portion, wherein the polymeric coating layer comprises a polymer derived from the polymerizable component composition; a peroxide source; and a fluorescent dye.

In accordance with a further embodiment of the invention, the oxalate is an oxalic-type diester having a typical formula: $R^1$—$O_2C$—$CO_2$—$R^2$ wherein, $R^1$ and $R^2$ are independently selected from the group consisting of an unsubstituted aryl group, a substituted aryl group, and an unsaturated alkane group.

In accordance with another embodiment of the invention, wherein the substituted aryl group is selected from the group consisting of chlorophenyl, dichlorophenyl, trichlorophenyl, nitrophenyl, dinitrophenyl, benzoylxyphenyl, formylphenyl, carboxyphenyl, methoxyphenyl, acetylaminophenyl, pyridylphenyl, sulfophenyl, 2,4,5-trichloro-6-carbopentoxyphenyl, and 2-carbopentyloxy-3,5,6-trichlorophenyl; and wherein the unsaturated alkane group is selected from the group consisting of vinyl, 2-propenyl, 2-octenyl, (1-phenyl) vinyl, 1-cyclohexenyl, and 1-cyclooctenyl.

In accordance with a further embodiment of the invention, the oxalate is selected from the group consisting of diphenyl oxalate; bis(2,4,6-trichlorophenyl)oxalate; bis(2,4,5-trichloro-6-(pentyloxycarbonyl)phenyl)oxalate (CPPO); bis(2-carbopentyloxy-3,5,6-trichlorophenyl)oxalate; bis(2,4,5-tribromo-6-carbohexyloxyphenyl)oxalate; bis(2-nitrophenyl)oxalate; bis(2,4-dinitrophenyl)oxalate; bis(2,6-dichloro-4-nitrophenyl) oxalate; bis(3-trifluoromethyl-4- nitrophenyl)oxalate; bis(2-methyl-4,6-dinitrophenyl) oxalate; bis(1,2-dimethyl-4,6-dinitrophenyl)oxalate; bis(2, 4-dichlorophenyl)oxalate; bis(2,4-dinitrophenyl)oxalate; bis (2,5-dinitrophenyl)oxalate; bis(2-formyl-4-nitrophenyl) oxalate; bis(pentachlorophenyl)oxalate; bis(1,2-dihydro-2-oxo-1-pyridyl)glyoxal; bis(2,4-dinitro-6-methylphenyl) oxalate; bis-N-phthalimidyl oxalate; bis(vanillyl)oxalate; bisvinyl oxalate; bisallyl oxalate; bis(2-propenyl)oxalate; bis(2-octenyl)oxalate; bis(1-phenyl)vinyl oxalate; 1-cyclohexenyl oxalate; and 1-cyclooctenyl oxalate.

In accordance with another embodiment of the invention, the polymerizable component composition comprises a mono-functional monomer, a di-functional monomer, or multi-functional compound, wherein a polymerizable functional group is an alpha, beta-unsaturated carbonyl compound.

In accordance with a further embodiment of the invention, the polymerizable component composition comprises: about 2 wt % to about 40 wt % of a mono-functional monomer; about 2 wt % to about 40 wt % of a di-functional monomer; and about 4 wt % to about 50 wt % of a multi-functional compound, wherein wt % is based on a total weight of the polymerizable component mixture.

In accordance with another embodiment of the invention, the fluorescent dye is intermixed in the oxalate-containing composition, intermixed with the peroxide source, present as a separate dye layer or particle, or present within another component of the chemiluminescent material.

In accordance with a further embodiment of the invention, the UV screening agent is a UV light absorber selected from the group consisting of p-t-butylphenyl salicylate; benzophenone; 2,4-dihydroxybenzophenone; 2-hydroxy-4-methoxybenzophenone; 2-hydroxy-4-octoxybenzophenone; 2(2'-hydroxy-4'-octoxyphenyl)benzotriazole, and a vat dye.

In accordance with another embodiment of the invention, the UV screening agent is the vat dye, wherein the vat dye is violanthrone or a violanthrone derivative.

In accordance with a further embodiment of the invention, the UV screening agent comprises the chemiluminescent dye as a substructure, and wherein the vat dye is an alkyloxy-violanthrone derivative.

In accordance with another embodiment of the invention, the peroxide source forms an exterior peroxide coating on an exterior surface of the polymeric coating layer.

In accordance with another embodiment of the present invention, a method of preparing a chemiluminescent material comprising an encapsulated oxalate-containing composition is provided. The method includes the steps of: dispersing an oxalate-containing composition in a fluid medium to form particles as a dispersed phase in a continuous phase of the fluid medium; and exposing the particles to ultraviolet radiation to induce polymerization of the polymerizable composition at a surface region of the particles thereby forming polymeric coatings around the particles to form the encapsulated oxalate-containing composition. A capsule of the encapsulated oxalate-containing composition comprises a core region that includes an uncured portion of the oxalate-containing composition encapsulated by a polymeric coating layer. The method may further include combining the encapsulated oxalate-containing composition with a peroxide source to form the chemiluminescent material. A fluorescent dye may be intermixed in the oxalate-containing composition, intermixed with the peroxide source, present in the chemiluminescent material as a separate dye layer or particle, or present within another component of the chemiluminescent material.

In accordance with a further embodiment of the invention, a method of preparing a chemiluminescent material comprising an encapsulated oxalate-containing composition, the method comprising the steps of: dispersing an oxalate-containing composition in a fluid medium to form particles as a dispersed phase in a continuous phase of the fluid medium, the oxalate-containing composition comprising: an oxalate; a polymerizable component composition comprising one or more monomers and/or oligomers that polymerize upon exposure to ultraviolet radiation, wherein the one or more monomers and/or oligomers is selected from the group consisting of acrylate monomers, acrylate oligomers, methacrylate monomers, methacrylate oligomers, and combinations thereof; a photosensitizer; and an ultraviolet screening agent; and exposing the particles to ultraviolet radiation to induce polymerization of the polymerizable component composition at a surface region of the particles thereby forming polymeric coatings around the particles to form the encapsulated oxalate-containing composition, wherein a capsule of the encapsulated oxalate-containing composition comprises a core region that includes an uncured portion of the oxalate-containing composition encapsulated by a polymeric coating layer; and combining the encapsulated oxalate-containing composition with a peroxide source, wherein a fluorescent dye is intermixed in the oxalate-containing composition, intermixed with the peroxide source, present as a separate dye layer or particle, or present within another component of the chemiluminescent material.

In accordance with another embodiment of the invention, the photosensitizer is present in an amount of about 0.1 to about 20 parts per 100 parts by weight of the polymerizable composition.

In accordance with a further embodiment of the invention, the ultraviolet screening agent is selected from the group consisting of oil-screening soluble dyes, loading and color pigments, and ultraviolet light absorbers.

In accordance with another embodiment of the invention, the ultraviolet screening agent is present in an amount of about 0.1 to about 20 parts per 100 parts by weight of the polymerizable composition.

In accordance with a further embodiment of the invention, the fluid medium comprises an aqueous solution; and wherein the plurality of monomers or oligomers comprises hydrophobic compounds.

In accordance with another embodiment of the invention, the aqueous solution comprises water and a water-soluble dispersing agent present in an amount of about 1 wt % to about 10 wt %, wherein wt % is based on a total mass of the aqueous solution.

In accordance with a further embodiment of the invention, exposing the particles to ultraviolet radiation is performed for a period of about 1 minute to about 30 minutes at a power of between about 500-1500 mJ/cm$^2$, e.g. about 1900-4100 mJ/cm$^2$, or 1900-2000 mJ/cm$^2$, or 1940 mJ/cm$^2$. The higher the energy, the thicker the walls.

In accordance with another embodiment of the invention, the fluid medium comprises a gaseous medium.

In accordance with the foregoing embodiments, the chemiluminescent materials disclosed herein may be suitable for numerous applications, including but not limited to writing device applications, and demonstrate improved stability.

BRIEF DESCRIPTION OF THE DRAWINGS

The accompanying drawing, which are incorporated in and constitute a part of this specification, illustrate embodiments of the invention and, together with a general description of the invention given above, and the detailed description given below, serve to explain the invention. The objects, features, and advantages of the present invention will be more fully understood by reading the following description taken in conjunction with the accompanying drawings, in which.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, shapes, and colors of various illustrated components, will be determined in part by the particular intended application and use environment. Certain features of the illustrated embodiments have been enlarged or distorted relative to others to facilitate visualization and clear understanding.

DETAILED DESCRIPTION OF THE INVENTION

The present invention relates to novel and improved chemiluminescent materials comprising microcapsules based on acrylate or methacrylate monomers and/or oligomers, and a method of preparing the same. An oxalate compound may be encapsulated with a polymeric acrylate- or methacrylate-based coating within a relatively short period of time by dispersing a composition comprising the oxalate compound, along with acrylate or methacrylate monomers and/or oligomers, a photosensitizer, and a ultraviolet screening agent in a fluid to form discreet particles, and then exposing the particles to ultraviolet light. The resultant capsules may be combined with a source of peroxide to form the intended chemiluminescent material. The requisite fluorescent dye for the chemiluminescent reaction may be 1) a chemical compound that is distinct and separate from the other materials; 2) a moiety within another component, such as a fluorescent oxalic acid ester; or 3) a chemical compound possessing dual functionality, such as a fluorescent dye/UV absorber or the fluorescent oxalic acid ester.

Figure 1:
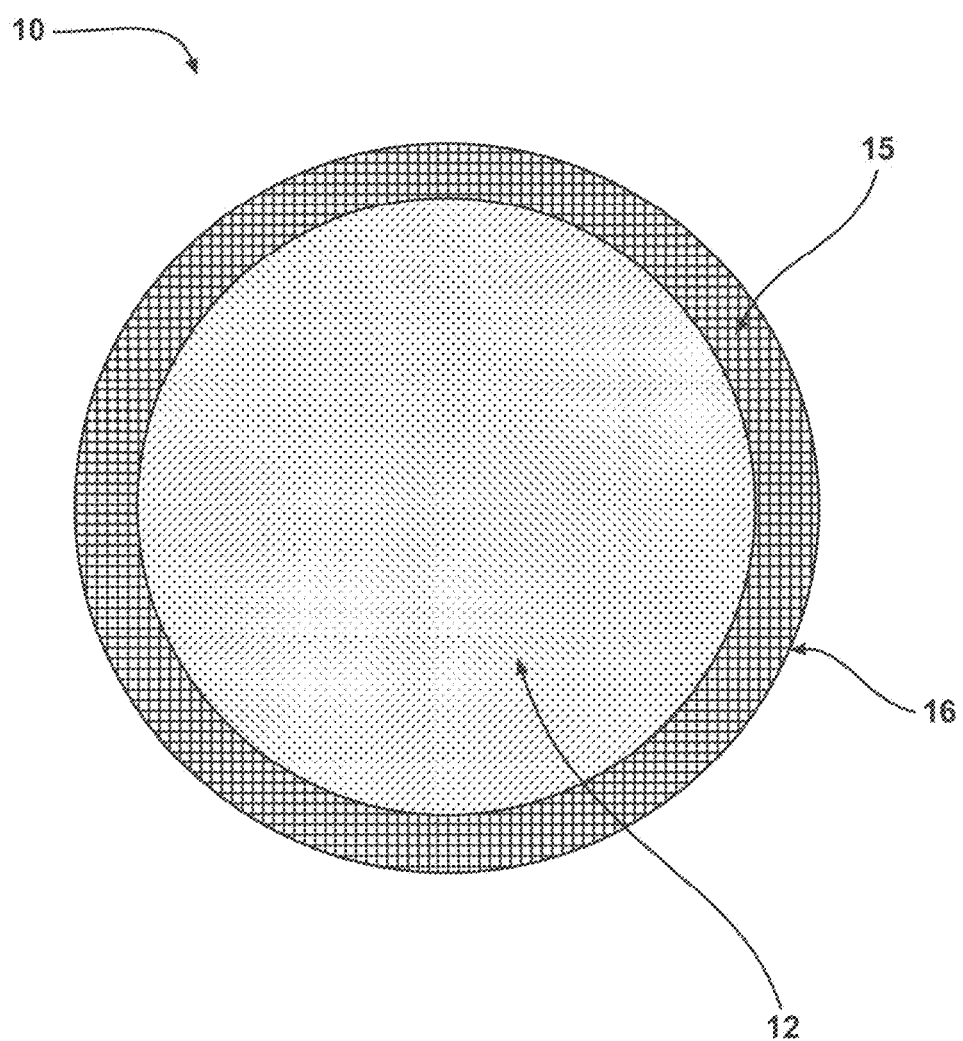
FIG. 1 illustrates an enlarged cross-sectional view of an encapsulated oxalate-containing composition, in accordance with an embodiment of the present invention.
Figure 2:
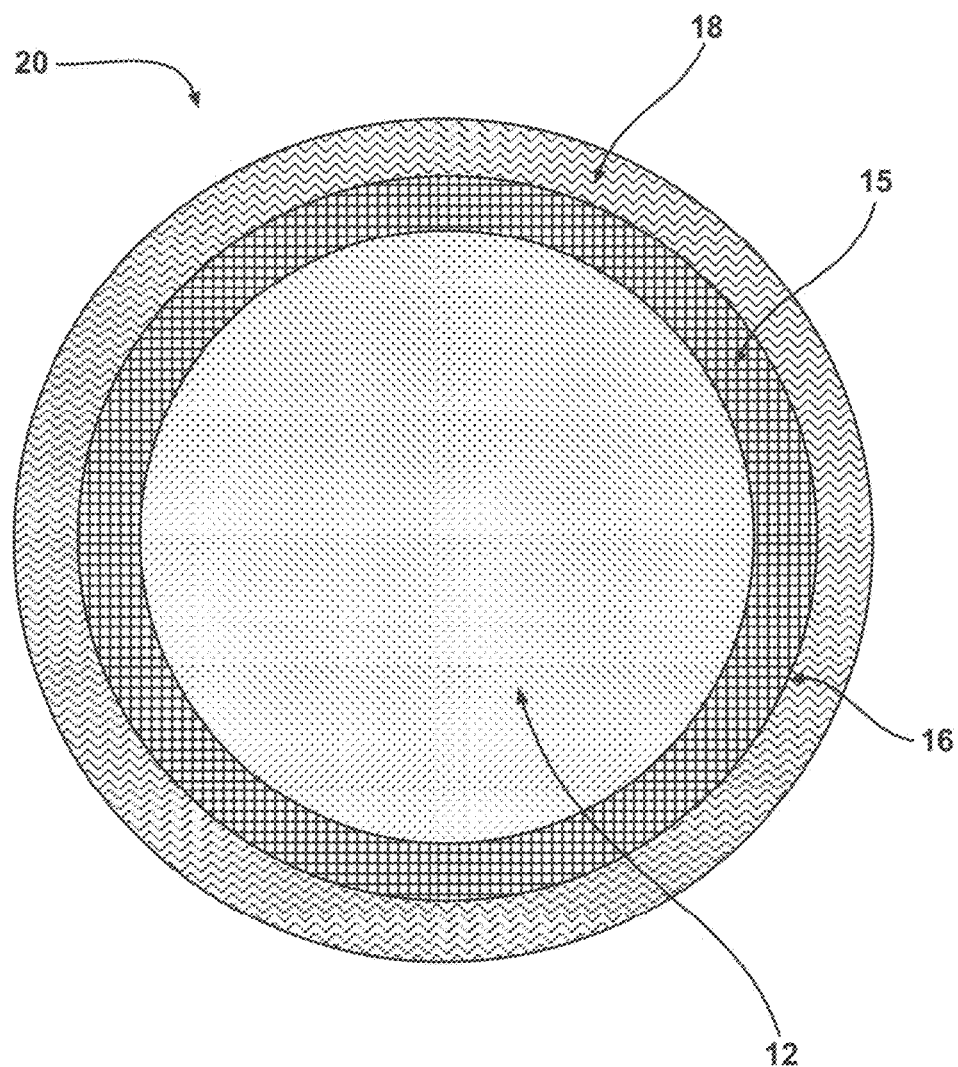
FIG. 2 illustrates an enlarged cross-sectional view of a chemiluminescent material that comprises an encapsulated oxalate-containing composition and a layer of a peroxide source, in accordance with another embodiment of the present invention.

More particularly and with reference to FIG. 1, an encapsulated oxalate-containing composition 10 is provided that includes a core portion 12 and a polymeric coating 15. With reference to FIG. 2, a chemiluminescent material 20 is provide that includes the encapsulated oxalate-containing composition, and an exterior peroxide coating 18. In addition to an oxalate, the core portion 12 may also include a polymerizable component composition comprising one or more monomers and/or oligomers that polymerize upon exposure to ultraviolet radiation, a photosensitizer, and an ultraviolet screening agent. The polymeric coating 15 surrounding the core portion comprises a polymer derived from the polymerizable component composition. In one embodiment, the exterior peroxide coating 18, which may be applied to or adjacent to an exterior surface 16 of the polymeric coating 15, includes a source of peroxide.

The acrylate- and methacrylate-based monomers and/or oligomers used herein in core portion 12 are not particularly limited as long as they are capable of polymerization upon exposure to ultraviolet light when a photosensitizer is added thereto. Some illustrative, non-limiting examples of the acrylate and methacrylate monomers/oligomers include 1) mono-functional compounds, such as 2-hydroxypropyl acrylate and methacrylate, methyl acrylate and methacrylate, ethyl acrylate and methacrylate, 2-ethylhexyl acrylate and methacrylate, cyclohexyl acrylate and methacrylate, diethylaminoethyl acrylate and methacrylate, glycidyl acrylate and methacrylate, tetrahydrofurfuryl acrylate and methacrylate, and isooctyl acrylate; 2) di-functional compounds such as ethylene glycol diacrylate and dimethacrylate, diethylene glycol diacrylate and dimethacrylate, triethylene glycol diacrylate and dimethacrylate, tetraethylene glycol diacrylate and dimethacrylate, polyethylene glycol diacrylate and dimethacrylate, 1,3-butylene glycol diacrylate and dimethacrylate, 1,6-hexanediol diacrylate and dimethacrylate, neopentyl glycol diacrylate and dimethacrylate, 2,2'-bis(4-acryloxypropyloxyphenyl)propane and 2,2'-bis(4-methacryloxypropyloxyphenyl)propane, 2,2'-bis(4-acryloxydiethoxyphenyl)propane and 2,2'-bis(4-methacryloxydiethoxyphenyl)propane; and 3) multi-functional compounds such as trimethylolpropane triacrylate and trimethacrylate, dicyclopentadiene monoacrylate and monomethacrylate, dicyclopentadiene ethoxy acrylate and methacrylate, dipentaerythritol pentacrylate, and urethane acrylate/methacrylate oligomers. These monomers and/or oligomers may also be used in combination with other UV curable monomers, such as epoxy (meth)acrylates, urethane (meth)acrylates, and unsaturated polyesters.

In addition to forming the polymeric coating 15 surrounding the core 12 portion, the polymerizable component mixture may also serve as a fluid carrier for the oxalate and the other components of the oxalate-containing mixture. In accordance with an embodiment of the invention, the polymerizable mixture is formed using a combination of mono-, di-, and multi-functional compounds to obtain desirable fluid properties of the resultant oxalate-containing composition. Viscosity, density, hydrophilicity, hydrophobicity, curing kinetics, etc. may be modified based on the types, quantities, and/or ratios of the various mono-, di-, and multi-functional compounds, as well as the other components/additives. In another embodiment of the invention, the polymerizable mixture comprises about 2 wt % to about 40 wt % of a mono-functional monomer; about 2 wt % to about 40 wt % of a di-functional monomer; and about 4 wt % to about 50 wt % of a multi-functional compound, wherein wt % is based on a total weight of the polymerizable component mixture. In a further embodiment of the invention, the polymerizable component mixture may be a combination of a urethane acrylate oligomer (e.g., Sartomer® CN310); dipentaerythritol pentacrylate (e.g., Sartomer® SR399); 1,6-hexanediol diacrylate (e.g., Sartomer® SR238B); and isooctyl acrylate (Sartomer® SR440). In yet another embodiment, the polymerizable component mixture is a combination of about 31 wt % of a urethane acrylate oligomer (e.g., Sartomer® CN310); about 7 wt % of dipentaerythritol pentacrylate (e.g., Sartomer® SR399); about 31 wt % of 1,6-hexanediol diacrylate (e.g., Sartomer® SR238B); and about 31 wt % of isooctyl acrylate (Sartomer® SR440).

To form the polymer coating 18, the polymerizable component composition may be cured by exposure to UV radiation. Accordingly, photosensitizers (or photoinitiators)

may be included in the composition to render the coatings sensitive to the UV radiation. Type I photosensitizers undergo a unimolecular bond cleavage upon irradiation to yield free radicals. Type II photosensitizers undergo a bimolecular reaction where the excited state of the photosensitizer interacts with a second molecule (a co-initiator, e.g., a tertiary amine) to generate free radicals. The photosensitizer may be selected from those commonly used in ultraviolet curing. Some illustrative, non-limiting examples of the photosensitizers include acetophenone; anthraquinone; benzoin; benzoin methyl ether; benzoin ethyl ether; benzoin isopropyl ether; benzoin isobutyl ether; benzophenone; xanthone; thioxanthone; 2,2'-diethoxyacetophenone; 2,2'-dimethoxy-2-phenylacetophenone; benzil, etc. Exemplary co-initiators include, but are not limited to, tertiary amines, which also includes acrylated amines. The presence of both components function to complement each other and are preferably used together. The presence of a tertiary amine co-sensitizer serves to speed up the cure rate. The photosensitizers may be added in amounts between about 0.1 and about 10 parts by weight per 100 parts by weight of the polymerizable component composition and, when present, the co-initiator to photosensitizer is typically in a ratio of 1/3 to 1/1.

Alternately, other photosensitizers that may be used include a class of IRGACURE® photosensitizers available from Ciba-Geigy Corporation, Seven Skyline Drive, Hawthorne, N.Y., 10532. In an embodiment, IRGACURE®651, which is 2,2-dimethoxy-1,2-diphenylethan-1-one, may be included in the oxalate-containing composition in about 3 wt % to about 5 wt % of can be used in the composition in place of the benzophenone/acrylated amine combination. If IGRACURE® photosensitizers are used in the composition, it is not necessary to include an acrylated amine co-initiator component.

The ultraviolet (UV) screening agent may be selected from dyes, pigments, and UV light absorbers as long as it substantially suppresses transmission of UV light through the oxalate-containing composition. The amount of the UV screening agent added depends on its UV screening ability or UV transmission, and the thickness of the capsule wall layer varies with the amount of the UV screening agent, UV illumination and exposure time. Oil-soluble dyes may be used as the dye while the pigment may be selected from a wide variety of loading pigments and color pigments including talc, clay, calcium carbonate, magnesium carbonate, and carbon black. Examples of the UV light absorbers include p-t-butylphenyl salicylate; benzophenone, 2,4-dihydroxy-benzophenone; 2-hydroxy-4-methoxybenzophenone; 2-hydroxy-4-octoxybenzophenone; 2(2'-hydroxy-4'-octoxyphenyl)benzotriazole, vat dyes, such as violanthrone or violanthrone derivatives (such as alkoxy-violanthrone derivative), etc. and they may be used individually or in mixtures of two or more. The amount of the UV screening agent added ranges from 0.1 parts to 20 parts by weight per 100 parts by weight of the polymerizable component mixture.

In an embodiment, the UV screening agent comprises an alkyloxy-violanthrone derivative, such as 16,17-butyloxyviolanthrone. Advantageously, 16,17-butyloxyviolanthrone also functions as fluorescent compound. Accordingly, in one aspect, desired suppression of UV light transmission through the oxalate-containing composition and the necessary fluorescent dye component of the chemiluminescence reaction may be realized by the dual-function capability of 16,17-butyloxyviolanthrone.

The oxalate compound suitable for use in the oxalate-containing composition includes any one or more of the oxalic-type diesters having a typical formula:

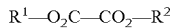

$$R^1-O_2C-CO_2-R^2$$

wherein, $R^1$ and $R^2$ are independently selected from unsubstituted or substituted aryl groups, e.g., phenyl, chlorophenyl, dichlorophenyl, trichlorophenyl, nitrophenyl, dinitrophenyl, benzoylxyphenyl, formylphenyl, carboxyphenyl, methoxyphenyl, acetylaminophenyl, pyridylphenyl, sulfophenyl, 2,4,5-trichloro-6-carbopentoxyphenyl, 2-carbopentyloxy-3,5,6-trichlorophenyl, or the like; or unsaturated alkane groups: e.g., vinyl, 2-propenyl, 2-octenyl, (1-phenyl) vinyl, 1-cyclohexenyl, 1-cyclooctenyl, or the like. Accordingly, symmetric oxalic-type diesters may be prepared by reacting oxalyl chloride with two equivalents of an alcohol compound in the presence of a base (e.g., trimethylamine). Asymmetric oxalic-type diesters may be prepared using a mixture of two or more alcohol compounds. Exemplary reactant alcohols include, but are not limited to, phenol, chlorophenol, dichlorophenol, trichlorophenol, nitrophenol, dinitrophenol, 4-(benzyloxy)phenol, methoxyphenol, p-acetylaminophenol, 2-(2-pyridyl)phenol, alkylsulfonyl-phenol, arylsulfonylphenol, 2,4,5-trichloro-6-carbopentoxy-phenol, 2-carbopentyloxy-3,5,6-trichlorophenol, 4-hydroxy-3-methoxybenzaldehyde (vanillin), methyl-2-hydroxybenzoate (wintergreen), allyl alcohol, etc.

Exemplary aryl oxalic-type esters include, but are not limited, to diphenyl oxalate (DPO), bis(2,4,6-trichlorophenyl)oxalate (TCPO), bis(2,4,5-trichloro-6-(pentyloxycarbonyl)phenyl)oxalate (CPPO), bis(2-carbopentyloxy-3,5,6-trichlorophenyl)oxalate, bis(2,4,5-tribromo-6-carbohexyloxyphenyl)oxalate, bis(2-nitrophenyl)oxalate, bis(2,4-dinitrophenyl)oxalate, bis(2,6-dichloro-4-nitrophenyl) oxalate, bis(3-trifluoromethyl-4-nitrophenyl)oxalate, bis(2-methyl-4,6-dinitrophenyl)oxalate, bis(1,2-dimethyl-4,6-dinitrophenyl)oxalate, bis(2,4-dichlorophenyl)oxalate, bis(2,4-dinitrophenyl)oxalate, bis(2,5-dinitrophenyl)oxalate, bis(2-formyl-4-nitrophenyl)oxalate, bis(pentachlorophenyl) oxalate, bis(1,2-dihydro-2-oxo-1-pyridyl)glyoxal, bis(2,4-dinitro-6-methylphenyl)oxalate, bis-N-phthalimidyl oxalate, bis(vanillyl)oxalate, or the like. Exemplary unsaturated alkane oxalic esters include bisvinyl oxalate, bisallyl oxalate, bis(2-propenyl)oxalate, bis(2-octenyl)oxalate, bis (1-phenyl)vinyl oxalate, 1-cyclohexenyl oxalate, 1-cyclooctenyl oxalate, or the like.

In an embodiment, the fluorescent dye may be intermixed in the oxalate-containing composition, intermixed with the peroxide source, present in the chemiluminescent material as a separate dye layer or particle, or present in the chemiluminescent material within one or more of the other components of the chemiluminescent materials (e.g., oxalate or UV screening dye).

The fluorescent compounds or dyes contemplated herein are numerous; and they may be defined broadly as those which do not readily react on contact with the peroxide employed in this invention, such as hydrogen peroxide; likewise, they do not readily react on contact with the diester of oxalic acid. Typical suitable fluorescent compounds for use in the present invention are those which have a spectral emission falling between 330 nm and 1,000 nm and which are at least partially soluble in any of the above diluents, if such diluent is employed. Among these are the conjugated polycyclic aromatic compounds having at least 3 fused rings, such as anthracene, substituted anthracene, benzanthracene, penanthrene, substituted phenanthrene, naphthacene, substituted naphthacene, pentacene, substituted pentacene, and the like. Typical substituents for all of these are phenyl, lower alkyl, chlorine, bromine, cyano, alkoxy ($C_1$-$C_{16}$), and other like substituents which do not interfere with the light-generating reaction contemplated herein.

Particularly effective as fluorescent dyes are rubrene (5,6,11,12-tetraphenyltetracene) and 9,10-bis(phenylethynyl)anthracene. However, numerous other fluorescent compounds having the properties given hereinabove are well known in the art. While only typical fluorescent compounds are listed hereinabove, the person skilled in the art is fully aware of the fact that this invention is not so restricted and that numerous other fluorescent compounds having similar properties are contemplated for use herein.

It is noted that a fluorescent ester such as the oxalic acid ester of 2-naphthol-3,6,8-trisulfonic acid does not require a separate fluorescent compound to obtain light. Other typical fluorescent oxalic acid esters include esters of oxalic acid (1) 2-carboxyphenol, (2) 2-carboxy-6-hydroxyphenol, (3) 1,4-dihydroxy-9,10-diphenylanthracene, and (4) 2-naphthol. Thus, a reactant including a fluorescent oxalic-type ester would thereby include at least one fluorescent compound.

The source of peroxide employed in the compositions and process of this invention may be obtained from any suitable peroxide compound or precursor. For example, the peroxide may be employed as solid sodium peroxide. Alternatively, sodium peroxide may be placed in aqueous solution whereby a solution of hydrogen peroxide is obtained. The peroxide employed may be obtained from anhydrous hydrogen peroxide compounds such as perhydrate or urea (urea peroxide), perhydrate of pyrophosphate (sodium pyrophosphate peroxide), pyrohydrate of histidine (histidine peroxide), sodium perborate, and the like. Still another form in which the anhydrous $H_2O_2$ may be provided in the composition is that of an anhydrous solution of $H_2O_2$ in a suitable solvent such as an ether, an ester, an aromatic hydrocarbon, etc., of the type which would provide a suitable diluent for the composition of this invention. Whenever hydrogen peroxide is contemplated to be employed, any suitable compound may be substituted which will produce hydrogen peroxide. Accordingly, non-limiting examples of sources for peroxide include hydrogen peroxide, sodium peroxide, sodium perborate, sodium pyrophosphate peroxide, urea peroxide, histidine peroxide, t-butylhydroperoxide peroxybenzoic acid, and combinations thereof.

Although not required, catalysts for the chemiluminescent composition may be included in the core portion, intermixed with the source of peroxide, or as part of a separate layer. Chemiluminescence reaction catalysts are well known in the prior art, and suitable catalysts may include sodium salicylate, sodium-5-fluorosalicylate, sodium-5-chlorosalicylate, sodium-5-bromosalicylate, sodium trifluoroacetate, potassium salicylate, potassium pentachlorophenolate, lithium salicylate, lithium-5-chlorosalicylate, lithium-3-chlorosalicylate, lithium-3,5-dichlorosalicylate, lithium-3,5,6-trichloro-salicylate, lithium-2-chlorobenzoate, lithium-5-t-butyl-salicylate, lithium trifluoroacetate, rubidium acetate, tetrabutylammonium salicylate, tetrabutylammonium tetrafluoborate, tetraethylammonium benzoate, tetrabutylammonium benzoate, tetrabutylammonium hexafluorophosphate, tetraethylammonium perchlorate, tetrabutylammonium perchlorate, tetraoctylammonium perchlorate, tetrabutylammonium-2,3,5-trichlorobenzoate, tetramethylammonium trifluoroacetate, magnesium salicylate, magnesium-5-t-butylsalicylate, magnesium-3-chlorosalicylate, magnesium-3,5-dichlorosalicylate, and magnesium-3,5,6-trichlorosalicylate. Preferably, the catalyst comprises sodium-5-chlorosalicylate or lithium-5-chlorosalicylate.

Solvent systems for chemiluminescent reactions are well established. A number of types of organic solvents may be used in formulating the oxalate-containing composition (e.g., as a diluent or as a compatibilizer). Exemplary organic solvents include a) ethers and polyethers such as diethylene glycol diethyl ether, diethylene glycol dimethyl ether, ethylene glycol dimethyl ethers; b) esters such as ethyl acetate, ethyl benzoate, dimethyl phthalate, dibutyl phthalate, dioctyl phthalate, methyl formate, triacetin, diethyl oxalate, and dioctyl terphthalate; c) aromatic hydrocarbons such as benzene, toluene, ethylbenzene, and butylbenzene; d) chlorinated hydrocarbons such as chlorobenzene, o-dichlorobenzene, m-dichlorobenzene, chloroform, carbon tetrachloride, hexachloroethane, and tetrachlorotetrafluoropropane. Typically used solvents include dialkyl phthalates (such as dimethyl phthalate, dibutyl phthalate, or dioctyl phthalate) and alkyl alcohols (such as t-butyl alcohol). Preferably, the solvent or mixture of solvents at least partially dissolves the dye, oxalate, and source of peroxide. Additionally, in certain encapsulation embodiments, the oxalate-containing composition needs to be hydrophobic, and thus it follows that hydrophobic solvents are also preferred. In one embodiment, dioctyl phthalate is included in the oxalate-containing composition.

Figure 3:
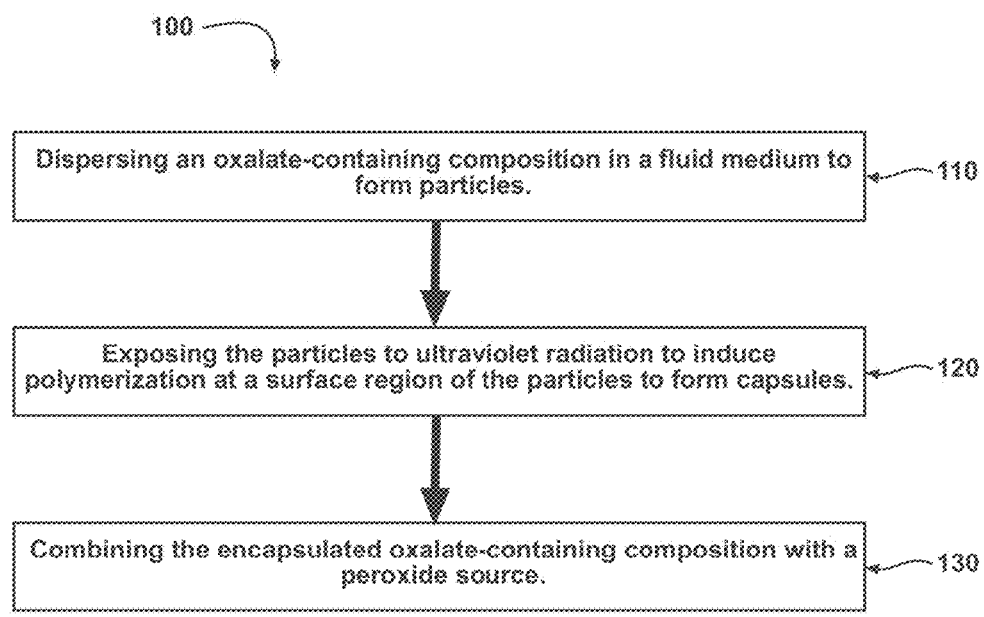
FIG. 3 illustrates a method for preparing a chemiluminescent material that comprises an encapsulated oxalate-containing composition, in accordance with another embodiment of the present invention.

In accordance with another embodiment of the present invention and with reference to FIG. 3, a method of preparing the chemiluminescent material comprising an encapsulated oxalate-containing composition is provided. The method (100) includes: dispersing an oxalate-containing composition in a fluid medium to form particles as a dispersed phase in a continuous phase of the fluid medium (Step 110); and exposing the particles to ultraviolet radiation to induce polymerization of the polymerizable component mixture at a surface region of the particles thereby forming polymeric coatings around the particles to form an encapsulated oxalate-containing composition (Step 120). The resultant capsule 10, as illustrated in FIG. 1, of the encapsulated oxalate-containing composition comprises a core region 12 that includes an uncured portion of the oxalate-containing composition encapsulated by a polymeric coating layer 15. The method further includes combining the encapsulated oxalate-containing composition with a peroxide source (Step 130).

Exemplary, non-limiting methods for combining the peroxide source with the encapsulated oxalate-containing composition 10 include: 1) coating the exterior surface 16 of the polymeric coating layer 15 with a solution of the peroxide source, followed by evaporation of the carrier solvent to provide the chemiluminescent material 20 illustrated in FIG. 2; or 2) admixing solid particles of the peroxide source with the capsules.

As discussed above, the fluorescent dye may be intermixed in the oxalate-containing composition, intermixed with the peroxide source, present in the chemiluminescent material as a separate dye layer or particle, or present in the chemiluminescent material within one or more of the other components of the chemiluminescent materials (e.g., oxalate or UV screening dye). Accordingly, one additional aspect of the present invention is the preparation of an encapsulated fluorescent dye composition, which may optionally include one or more chemiluminescence reaction catalysts. Similar to encapsulating the oxalate-containing composition, the fluorescent dye may be combined with a photosensitizer and a UV screening dye within a polymerizable component or component mixture.

In accordance with embodiments of the present invention, the fluid medium may comprise a gaseous or a liquid medium. For the gaseous medium, an inert gas, such as argon, nitrogen, xenon, etc. may be present (static) or the inert gas may be introduced at a specified or desired flowrate. Measured portions (e.g., 0.05 mL) of the oxalate-containing composition may be sequentially introduced into the gaseous medium and exposed to UV radiation to induce curing. In an embodiment, a UV lamp assembly includes an internal quartz tube having an upward flow of inert gas. Measured portions of the oxalate-containing composition introduced into the fluid medium form into generally spherical particles as they fall under the force of gravity through the internal quartz tube of the UV lamp assembly and pass by a UV radiation source. The intensity of the UV radiation source may be correlated to the transient time of the falling particles within the assembly (i.e., duration of exposure) to effect the desired quantity of curing of the polymerizable component mixture at the surface of the particle. In another embodiment, the upward flowrate of the inert gas may be controlled to adjust the transient time of the falling particles.

Alternatively, the fluid medium may comprise a liquid such as water, an aqueous solution, or an organic solvent. In an embodiment, the oxalate-containing composition is formulated with hydrophobic monomers/oligomers, and a portion of the composition is introduced into water or an aqueous solution containing a dispersing agent. The water or aqueous solution may be employed in a batch or flow cell configuration. For example, in a batch configuration and under sufficient agitation, the bulk portion of the oxalate-containing composition may be broken up into smaller particles and dispersed within the fluid medium. Also, the oxalate-containing composition may be introduced as measured aliquots into the water or the aqueous solution containing the dispersing agent.

Exemplary dispersing agents may include surfactants or water soluble high molecular weight compounds. Non-limiting examples of surfactants include cationic surfactants, nonionic surfactants, anionic surfactants, and zwitterionic surfactants. Non-limiting examples of water soluble high molecular weight compounds include gum arabic, tragacanth gum, guar gum, locust bean gum, sodium alginate, carboxymethyl cellulose, hydroxyethyl cellulose, methyl cellulose, polyvinyl alcohol, gelatin, albumin, casein, polyvinyl pyrrolidone, etc. The dispersing agents not only serve to help break the bulk portions into smaller particles, but also have the function of preventing the agglomeration of the resultant particles. The amount of the dispersing agent in the aqueous solution preferably ranges from about 1 wt % to about 10 wt %, wherein wt % is based on the weight of water.

In another aspect, the oxalate-containing composition may be formulated to obtain the desired fluid properties, such as viscosity, density, hydrophobicity (or hydrophilicity), curing kinetics, etc. For example, the oxalate containing composition may be formulated to have a density that is about equal to or slightly greater than 1.

Upon exposure to UV radiation, the particles of the oxalate-containing composition dispersed in the liquid undergo polymerization or curing. Since the UV screening agent is present in the oxalate-containing composition particles, this polymerization reaction takes place only at or near the surface region of the particles, and curing does not proceed throughout the interior of the particles. After terminating UV radiation exposure, the interior of the particles remains uncured and is thus encapsulated. The UV exposure results in particles or capsules having a core portion 12 of uncured oxalate-containing composition and a solid polymeric coating layer 15 of the cured polymerizable component mixture, as illustrated in FIG. 1.

Since the present method of preparing capsules from the oxalate-containing composition only requires the steps of dispersing the monomer or oligomer to form particles and exposing the particles to UV radiation, micro-capsules can be prepared very easily in a controlled manner within a short period of time. Moreover, the encapsulated oxalate-containing composition demonstrates superior stability. The chemiluminescent materials comprising the encapsulated oxalate-containing composition, are amenable for formulating into writing devices, such as ones similar to crayons, or molding into other desired shapes and configurations, e.g. wax crayons, glue stick-like formulations, and sidewalk 'chalk'.

Thus in accordance with another embodiment, a chemiluminescent writing device is provided that includes the encapsulated oxalate-containing composition dispersed in a supporting matrix, e.g., a wax. The encapsulated oxalate-containing composition may have a peroxide source coating as illustrated in FIG. 2, or the peroxide source may also be dispersed in the supporting matrix. Upon application of friction, the encapsulated oxalate-containing composition ruptures releasing the fluid oxalate-containing composition contained therein, which then dissolves/intermixes with the peroxide source thereby enabling the chemiluminescent reaction to proceed.

The following working examples will further illustrate the practice of the present invention as herein disclosed. They are given by way of illustration and are not to be construed as limiting the invention.

Example 1

TABLE 1

Hydrophobic monomer formulation of the oxalate-containing composition.

| Reagent | Amount | Function |
| --- | --- | --- |
| Sartomer CN310 | 20 g | Oligomer |
| Sartomer SR399 | 4.0 g | Multi-functional monomer |
| Sartomer SR238B | 20 mL | Di-functional monomer |
| Sartomer SR440 | 20 mL | Mono-functional monomer |
| 16,17-butyloxyviolanthrone | 0.12 g | UV screening agent and Fluorescent dye |
| CPPO | 15 g | Oxalate |
| BASF Irgacure 651 | 1.5 g | Photosensitizer |

With the exception of the violanthrone dye, combine all other compounds in an amber mixing vessel, heat and stir at 50° C. until dissolved (e.g., about 3 hours). Add the violanthrone dye, continue heating, and stir for an additional 2 hours at 50° C. Allow the resultant solution to cool to room temperature.

Capsule creation: Hydrophobic monomer-Hydrophilic fluid medium

The fluid injection system utilizes a Nordson EFD piston valve 725D. The valve is opened with approximately 70 psi air, which is computer controlled using a National Control Devices ProXR relay control unit and a Parker Pneumatic Division EZ21NBB549A valve. Additionally, UV radiation is created with a Clearstone Technologies CF2000, emitting at 365 nm. Both the pneumatics and UV source are computer controlled using a program written with Microsoft Visual Basic 2008. The program controls the length of time the syringe valve is open, the delay between the droplets, and the number of droplets created. The program also controls the UV light by varying the intensity and the length of time the lamp is on. In a typical experiment, the syringe reservoir is filled with the oxalate-containing composition formulation and then pressurized to 10.0 psi. A 1.5 inch flat tipped stainless steel needle (EFD amber, 15 gauge, inner diameter=1.36 mm) is affixed to the dispensing valve. The system is primed and the needle tip lowered into a 1000 mL Erlenmeyer flask filled to about 1 inch from the top with distilled water. The needle tip is submerged about 1 inch below the water line, and the water is stirred with a 3 inch stir bar at approximately 100 rpm.

When the computer program is started, the UV light is immediately turned on. The valve is opened for a preset time (typically 50 milliseconds) followed by a 750 millisecond pause. The ejected droplet slowly falls away from the tip and takes on a substantially spherical shape. Eventually the capsule is caught in the stirring vortex, where it is forced past the UV light multiple times. In this batch configuration, about 100 capsules can be made at a time in a 1000 mL Erlenmeyer flask.

After the last capsule of the run is ejected, the capsules are continued to be stirred past the UV light for an additional 2 minutes. When the run is complete, the majority of the water is poured off, and the capsules are suction filtered and rinsed with methanol to speed drying. The capsules may be dried in air overnight.

Example 2

TABLE 2

Hydrophobic monomer formulation of the oxalate-containing composition.

| Reagent | Amount | Function |
| --- | --- | --- |
| Sartomer SR440 | 7.5 mL | Mono-functional monomer |
| Sartomer SR238B | 2.5 mL | Di-functional monomer |
| 9,10-Bis(phenylethynyl)anthracene | 15 mg | Fluorescent dye |
| Benzophenone | 0.75 g | UV Screening agent |
| CPPO | 1.0 g | Oxalate |
| BASF Irgacure 651 | 50 mg | Photosensitizer |

Combine all the ingredients and stir until dissolved at room temperature to form a monomer composition.

Capsule creation: Hydrophobic monomer-Hydrophilic fluid medium Pour the monomer mixture into a beaker filled with about 1000 mL of water, while mechanically stirring at about 100 rpm. The mixture is stirred for about 15 seconds, until monomer droplets are evenly dispersed. Turn on the UV light for 30 seconds. When the run is complete, filter the capsules, wash with methanol, then air dry overnight. The resulting capsules have a liquid core and hard shell.

Example 3

TABLE 3

Hydrophilic monomer formulation of the fluorescent dye.

| Reagent | Amount | Function |
| --- | --- | --- |
| Sartomer SR9038 | 30.0 g | Monomer |
| 16,17-butyloxyviolanthrone | 90 mg | UV screening agent and fluorescent dye |
| BASF Irgacure 651 | 0.75 g | Photosensitizer |
| Water | 0.30 mL | ~ |
| Sodium salicylate | 30 mg | Catalyst |

Combine the first two ingredients in Table 3 in an amber mixing vessel, heat and stir at 60° C. until dissolved (e.g., about 2 hours). Add the third ingredient and continue to heat and stir at 60° C. for an additional 30 minutes. Allow the resultant solution to cool to room temperature. Combine the last two ingredients in a separate container to dissolve, then add to the master batch. Stir at room temperature for 15 minutes until homogenous.

Capsule creation: Hydrophilic monomer-Hydrophobic fluid medium

In a typical experiment, using a similar physical configuration as described in Example 1 (with a few changes detailed below), the syringe reservoir is filled with the monomer formulation and then pressurized at 10 psi. A 0.5 inch long PTFE-lined needle (EFD pink, 20 gauge, 0.30 mm inner diameter) is affixed to the dispensing valve. The system is primed and the needle tip is centered over the middle of a 250 mL graduated cylinder. The graduated cylinder is filled with 250 mL of pure soybean oil, with the tip suspended over the oil by 2 inches. The oil is stirred at 150 rpm.

When the computer program is started, the UV light is immediately turned on. The valve is opened for a preset time (typically 50 milliseconds) followed by a 2000 millisecond pause. The droplet falls into the oil, and slowly sinks past the UV light where the outer monomer is cured to a hard shell. About 250 capsules can be made at a time. After the last capsule of the run is ejected, the capsules are continued to be stirred past the UV light for an additional 2 minutes. When the run is complete, the capsules are suction filtered and rinsed with a solvent to remove excess or residual oil. The capsules may be dried in air overnight.

Example 4—Microencapsulation with UV Curing

TABLE 4

Solution A, hydrophobic monomer formulation of the oxalate-containing composition.

| Reagent | Amount | Function |
| --- | --- | --- |
| Sartomer SR-399 | 2.5 g | Monomer |
| Sartomer SR-238B | 2.5 mL | Di-functional monomer |
| Benzophenone | 0.75 g | UV screening agent |
| BASF Irgacure 651 | 0.25 g | Photosensitizer |
| Infrared Glowstick Core | 5 mL | Oil medium containing butyl benzoate, CPPO, and fluorescent dye |

TABLE 5

Solution B

| Reagent | Amount | Function |
| --- | --- | --- |
| Distilled water | 1000 mL | |
| Solution of 20 g poly (vinyl alcohol) (13-23k molecular weights, 87-89% hydrolyzed) dissolved in 200 mL distilled water | 10 mL | Encourages spherical shape of capsules |

First, solution B reagents were placed into a container and stirred in order to fully mix the poly(vinyl alcohol) solution in the distilled water. Next, solution A was added to solution B and stirred to create fine droplets of solution A in solution B, e.g. about 5-30 seconds. Next, the container was irradiated with LED UV light, e.g. 365 nm for a time sufficient to encapsulate the fine droplets, e.g. 60 seconds at 1936 mJ/cm$^2$. The capsules were decanted and rinsed several times, suction filtered, and dried overnight. The ratios of UV screening agent to photosensitizer may be adjusted as desired to achieve desired performance characteristics of the final product. Too little UV screening agent in comparison to the UV intensity yields capsules that have no liquid core. Instead, they are cured all the way through, which is not desirable.

The prior art method of encapsulation (complex coacervation method) was compared to the present method (UV curing method), and presented in Table 6 below.

0.75 g of microcapsules made by the prior art complex coacervation method were measured into a cuvette, then crushed. 0.75 mL of hydrogen peroxide was added to the crushed capsules, and the cuvette was placed into a Cary Eclipse fluorometer. Maximum sample brightness developed roughly 5 minutes after mixing. The process was repeated for 0.75 g of capsules made by the UV curing method. Normalized brightness was determined by dividing the Day 14 maximum brightness by the Day 1 maximum brightness.

TABLE 6

|  |  | Complex Coacervation Microcapsules | UV Curing Microcapsules |
|---|---|---|---|
| Day 1 | Maximum brightness | 278 au | 240 au |
|  | Normalized maximum brightness | 1.00 | 1.00 |
|  | Flow | Free-flowing | Free-flowing |
| Day 14 | Maximum brightness | 138 au | 161 au |
|  | Normalized maximum brightness | 0.50 | 0.67 |
|  | Flow | Clumping, leaking | Free-flowing, impermeable |
|  | Fabrication water contact time | >4 hours | <2 minutes |

In addition to the modest increase in maximum brightness on day 14, the UV curing method reduces the water contact time for the regents by several orders of magnitude, i.e. from 4 hours to less than 2 minutes, which corresponds to less degradation of the capsule's contents and significantly increased shelf life.

While the present invention has been illustrated by the description of one or more embodiments thereof, and while the embodiments have been described in considerable detail, they are not intended to restrict or in any way limit the scope of the appended claim to such detail. Additional advantages and modification will be readily apparent to those skilled in the art. The invention in its broader aspects is therefore not limited to the specific details, representative apparatus and methods and illustrative examples shown and described. Accordingly, departures may be made from such details without departing from the scope or the spirit of the general inventive concept exemplified herein.

What is claimed is:

1. A chemiluminescent material comprising
an encapsulated oxalate-containing composition, comprising:
a core portion comprising the oxalate-containing composition comprising:
an oxalate;
a polymerizable component composition comprising one or more monomers and/or oligomers that polymerize upon exposure to ultraviolet radiation, wherein the one or more monomers and/or oligomers is selected from the group consisting of acrylate monomers, acrylate oligomers, methacrylate monomers, methacrylate oligomers, and combinations thereof;
a photosensitizer; and
an ultraviolet (UV) screening agent;
a polymeric coating layer surrounding the core portion, wherein the polymeric coating layer comprises a polymer derived from the polymerizable component composition;
a peroxide source; and
a fluorescent dye.

2. The chemiluminescent material of claim 1, wherein the oxalate is an oxalic-type diester having a typical formula:

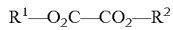

wherein, $R^1$ and $R^2$ are independently selected from the group consisting of an unsubstituted aryl group, a substituted aryl group, and an unsaturated alkane group.

3. The chemiluminescent material of claim 2, wherein the substituted aryl groups is selected from the group consisting of chlorophenyl, dichlorophenyl, trichlorophenyl, nitrophenyl, dinitrophenyl, benzoylxyphenyl, formylphenyl, carboxyphenyl, methoxyphenyl, acetylaminophenyl, pyridylphenyl, sulfophenyl, 2,4,5-trichloro-6-carbopentoxyphenyl, and 2-carbopentyloxy-3,5,6-trichlorophenyl; and wherein the unsaturated alkane group is selected from the group consisting of vinyl, 2-propenyl, 2-octenyl, (1-phenyl)vinyl, 1-cyclohexenyl, and 1-cyclooctenyl.

4. The chemiluminescent material of claim 1, wherein the oxalate is selected from the group consisting of diphenyl oxalate; bis(2,4,6-trichlorophenyl)oxalate; bis(2,4,5-trichloro-6-(pentyloxycarbonyl)phenyl)oxalate; bis(2-carbopentyloxy-3,5,6-trichlorophenyl)oxalate; bis(2,4,5-tribromo-6-carbohexyloxyphenyl)oxalate; bis(2-nitrophenyl) oxalate; bis(2,4-dinitrophenyl)oxalate; bis(2,6-dichloro-4-nitrophenyl) oxalate; bis(3-trifluoromethyl-4-nitrophenyl) oxalate; bis(2-methyl-4,6-dinitrophenyl)oxalate; bis(1,2-dimethyl-4,6-dinitrophenyl)oxalate; bis(2,4-dichlorophenyl)oxalate; bis(2,4-dinitrophenyl)oxalate; bis (2,5-dinitrophenyl)oxalate; bis(2-formyl-4-nitrophenyl) oxalate; bis(pentachlorophenyl)oxalate; bis(1,2-dihydro-2-oxo-1-pyridyl)glyoxal; bis(2,4-dinitro-6-methylphenyl) oxalate; bis-N-phthalimidyl oxalate; bis(vanillyl)oxalate; bisvinyl oxalate; bisallyl oxalate; bis(2-propenyl)oxalate; bis(2-octenyl)oxalate; bis(1-phenyl)vinyl oxalate; 1-cyclohexenyl oxalate; and 1-cyclooctenyl oxalate.

5. The chemiluminescent material of claim 1, wherein the polymerizable component composition comprises a mono-functional monomer, a di-functional monomer, or multi-functional compound, wherein a polymerizable functional group is an alpha, beta-unsaturated carbonyl compound.

6. The chemiluminescent material of claim 1, wherein the polymerizable component composition comprises:
about 2 wt % to about 40 wt % of a mono-functional monomer;
about 2 wt % to about 40 wt % of a di-functional monomer; and
about 4 wt % to about 50 wt % of a multi-functional compound,
wherein wt % is based on a total weight of the polymerizable component mixture.

7. The chemiluminescent material of claim 1, wherein the fluorescent dye is intermixed in the oxalate-containing composition, intermixed with the peroxide source, present as a separate dye layer or particle, or present within another component of the chemiluminescent material.

8. The chemiluminescent material of claim 1, wherein the UV screening agent is a UV light absorber selected from the group consisting of p-t-butylphenyl salicylate; benzophenone; 2,4-dihydroxybenzophenone; 2-hydroxy-4-methoxybenzophenone; 2-hydroxy-4-octoxybenzophenone; 2(2'-hydroxy-4'-octoxyphenyl)benzotriazole, and a vat dye.

9. The chemiluminescent material of claim 8, wherein UV screening agent is the vat dye, wherein the vat dye is violanthrone or a violanthrone derivative.

10. The chemiluminescent material of claim 9, wherein the UV screening agent comprises the chemiluminescent dye as a substructure, and wherein the vat dye is an alkyloxy-violanthrone derivative.

11. The chemiluminescent material of claim 1, wherein the peroxide source forms an exterior peroxide coating on an exterior surface of the polymeric coating layer.

12. A method of preparing a chemiluminescent material comprising an encapsulated oxalate-containing composition, the method comprising the steps of:
dispersing an oxalate-containing composition in a fluid medium to form particles as a dispersed phase in a continuous phase of the fluid medium, the oxalate-containing composition comprising:
an oxalate;
a polymerizable component composition comprising one or more monomers and/or oligomers that polymerize upon exposure to ultraviolet radiation, wherein the one or more monomers and/or oligomers is selected from the group consisting of acrylate monomers, acrylate oligomers, methacrylate monomers, methacrylate oligomers, and combinations thereof;
a photosensitizer; and
an ultraviolet screening agent; and
exposing the particles to ultraviolet radiation to induce polymerization of the polymerizable component composition at a surface region of the particles thereby forming polymeric coatings around the particles to form the encapsulated oxalate-containing composition, wherein a capsule of the encapsulated oxalate-containing composition comprises a core region that includes an uncured portion of the oxalate-containing composition encapsulated by a polymeric coating layer; and
combining the encapsulated oxalate-containing composition with a peroxide source,
wherein a fluorescent dye is intermixed in the oxalate-containing composition, intermixed with the peroxide source, present as a separate dye layer or particle, or present within another component of the chemiluminescent material.

13. The method according to claim 12, wherein the photosensitizer is present in an amount of about 0.1 to about 20 parts per 100 parts by weight of the polymerizable composition.

14. The method according to claim 12, wherein the ultraviolet screening agent is selected from the group consisting of oil-screening soluble dyes, loading and color pigments, and ultraviolet light absorbers.

15. The method according to claim 12, wherein the ultraviolet screening agent is present in an amount of about 0.1 to about 20 parts per 100 parts by weight of the polymerizable composition.

16. The method according to claim 12, wherein the fluid medium comprises an aqueous solution; and wherein the plurality of monomers or oligomers comprises hydrophobic compounds.

17. The method according to claim 16, wherein the aqueous solution comprises water and a water-soluble dispersing agent present in an amount of about 1 wt % to about 10 wt %, wherein wt % is based on a total mass of the aqueous solution.

18. The method according to claim 12, wherein exposing the particles to ultraviolet radiation is performed for a period of about 1 minute to about 30 minutes at a power of between about 500-1500 mJ/cm$^2$.

19. The method according to claim 12, wherein the fluid medium comprises a gaseous medium.

* * * * *